Dec. 6, 1960
R. E. ANDERSON ET AL
2,963,092
TESTING TOOL
Filed Aug. 29, 1956
FIG. 1.
FIG. 2.
FIG. 3.
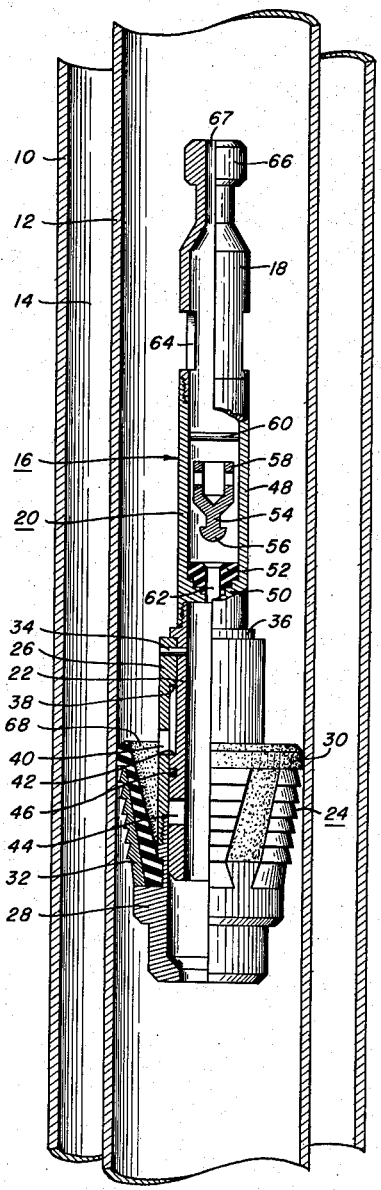
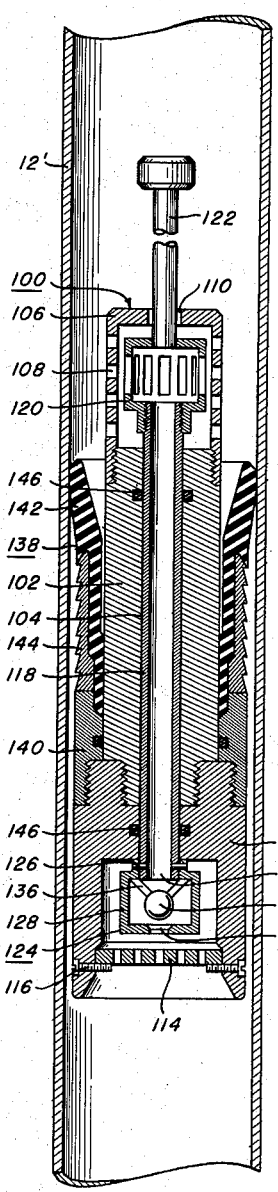
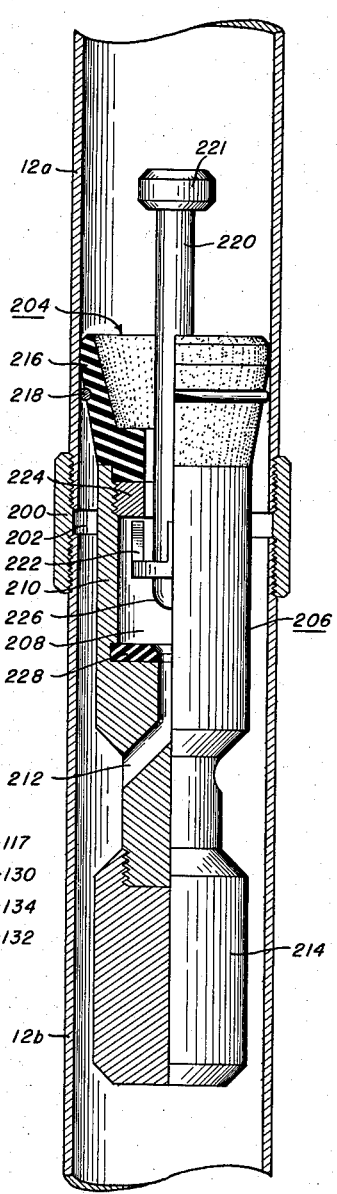
INVENTORS.
Roy E. Anderson,
Frank W. Cole,
Jack L. Lamberson, Jr.,
BY John W. Kenneday,
ATTORNEY 2,963,092
   TESTING TOOL Roy Eugene Anderson, Beaumont, Tex., Frank W. Cole, Norman, Okla., and John W. Kenneday, Houston, and Jack L. Lamberson, Jr., Baytown, Tex., assignors, by mesne assignments, to Jersey Production Research Company, Tulsa, Okla., a corporation of Delaware Filed Aug. 29, 1956, Ser. No. 606,915

5 Claims. (Cl. 166—121)

This invention relates to a wire line testing tool for testing the soundness of a string of tubing positioned in a casing lining a well bore penetrating the earth's surface. More particularly, the present invention is directed to a wire line testing tool for testing the soundness of a string of tubing and for locating leaks therein.

An object of the present invention is the provision of a wire line testing tool for determining the soundness of a length of tubing positioned in a casing in a well bore traversing an earthen formation and for determining the location of leaks in the tubing.

Another object is the provision of a wire line testing tool for sequentially testing selected portions of a length of tubing in order to determine the presence and location of leaks therein.

These and other objects are attained, in general, through the provision of a wire line testing tool comprising a body portion having an opening extending therethrough, a mandrel in said opening partially closing the same, means carried by said body portion and engaging said mandrel for supporting said mandrel in a position to provide fluid communication between the top and bottom of said body portion through the normally unclosed portion of said opening, closing means carried by said mandrel for closing said normally unclosed portion of said opening on application of downwardly directed fluid pressure, a deformable packing member fixed to the outside of said body portion, said packing member having a surface portion deformable into engagement with said wall of said opening on closing of said normally unclosed portion of said opening, anchoring means embedded in said surface portion of said packing member, means on said mandrel movable on application of upward tension to said mandrel for reestablishing said unrestricted fluid communication and means on said mandrel independent of said closing means for supporting said body portion on said mandrel on continued application of upward tension to said mandrel.

The invention will be further illustrated and described with reference to the accompanying drawings wherein:

Fig. 1 is an elevational view, partly in section, showing one embodiment of the present invention;

Fig. 2 is a side elevational view in section showing another embodiment of the present invention; and Fig. 3 is a side elevational view, partially in section, showing a further embodiment of the present invention.

Testing tool of Figure 1

Turning now to Fig. 1, there is shown a casing 10 positioned in the bore of a well (not shown) penetrating an earthen formation. Positioned within the casing 10 is tubing 12. An annular space 14 is defined by the casing 10 and the tubing 12.

In accordance with the present invention there is provided a tubing testing tool designated generally by the numeral 16 which may be positioned within the tubing 12 and manipulated therein by means of a suitable wire line-fishing tool combination (not shown). The tubing testing tool 16 of Fig. 1 is provided with a bored fish neck 18 having secured to the bottom thereof a bored valve assembly 20 to be subsequently described. The valve assembly 20 is secured to a supporting tube 22 to which is detachably fixed a packing member of any suitable construction, designated generally by the numeral 24.

For example, packing member 24 may comprise an internally bored body portion 26 to which is secured at the lower end thereof a ring shaped packer support ring 28 having secured thereto, in turn, a pressure deformable packing member 30 formed of any suitable material such as reinforced hard rubber. A plurality of slips 32 are fixed to the deformable packer 30 and keyed to the ring member 28.

It will be noted that the body portion 26 is supported by support tube 22 by means of shear pins 34 and that the body portion 26 normally abuts a flange 36 at the upper end of the supporting tube 22. The body portion 26 is cut away adjacent the bottom portion thereof to provide an upper shoulder 38. The body portion 26 is also provided with a plurality of outer ports 40 for a purpose to be described.

The supporting tube 22 is provided with a segment of reduced diameter opposite the outer ports 40 whereby a lower shoulder 42 is provided on the lower portion of the supporting tube 22. The supporting tube 22 is provided with a plurality of inner ports 44 below the shoulder 42 and with suitable sealing means such as an O-ring 46 for providing a fluid-tight seal between the supporting tube 22 and the body portion 26.

The bored valve assembly 20 may be of any suitable construction comprising, for example, a tubular body member 48 having an interior collar 50 to which is secured a valve seat 52 which may be of any suitable construction and may be formed of any suitable material such as, for example, hard rubber. A check valve 54 is positioned in the bore of the body member 48 of the valve assembly 20 and comprises, for example, a valve head 56 and a ported hollow body portion 58. A suitable retaining pin or spider 60 may be fixed in the bore of the body portion 48 in order to prevent loss of the check valve 54.

From the foregoing description, it is seen that the fish neck 18, the valve assembly 20, and the support tube 22 constitute an interconnected integral unit which may alternately be defined as a mandrel positioned in the opening of the body portion 26 and that the shear pin 34 may be considered as a releasable support means carried by the thus-defined mandrel for engaging the body portion 26 in order to support the same on the above-identified mandrel.

Operation of the testing tool of Figure 1

In operation, the testing tool 16 is lowered through the tubing 12 to a selected depth by means of a fishing tool (not shown) supported by a wire line (not shown); the fishing tool being attached to the fish neck 18. While the testing tool 16 is being lowered through the tubing 12, fluent material therein will be by-passed in that the fluent material will flow upwardly through the opening of the packer support ring 28 and through the interior of the supporting tube 22 to the valve assembly 20. The fluent material will next flow upwardly and out the ports 64 in the fish neck 18 and also through the bore 67 at the top thereof. A portion of the fluent material will also flow upwardly through the annular space between the wall of the tubing 12 and the outer surface of the packing member 30 and the slips 32.

After the testing tool 16 has been lowered to a desired depth, fluid pressure is directed downwardly through the interior of the tubing 12 by any suitable means (not shown). As a consequence, the fluent material will enter the space 68 between the packing gland 30 and the exterior surface of the body portion 26, whereby the packing gland 30 will be expanded to force the slips 32 into firm engagement with the wall of the tube 12. At the same time, the downward flow of fluent material through the ports 64 and the bore 67 of the fish neck 18 will cause the valve 54 to move downwardly against the valve seat 52 whereby the valve head 56 will close the opening 62. As a consequence, the portion of the length of tubing above the thus positioned testing tool 16 will be isolated from the portion therebelow and such upper portion may be tested for soundness through the continued application of fluid pressure to the portion of the tubing above the testing tool 16.

After the test has been made, fluid pressure is bled off or released until the pressure above and below the testing tool 16 is equalized. The testing tool 16 may then be lowered to the next succeeding desired depth and seated at the next desired position in the above described manner. In this fashion the entire length of tubing may be sequentially tested for soundness whereby the location of any leaks therein will be positively determined. That is to say, if the pressure applied to the interior of the tubing with the said testing tool 16 is substantially constant at a first selected location but is of a declining value at the next succeeding location of the testing tool 16 it will be known that there is a leak in the tubing between the said first and second selected locations. As a consequence, repair of the tubing is greatly facilitated.

When it is desired to terminate testing operations and/or when the testing tool 16 has been lowered to the bottom of the string of tubing 12, the testing tool 16 may be raised to the top of the tubing 12 by a very simple sequence of operations. Fluid pressure is directed downwardly through the tubing 12 to set the slips 32 and the check valve 54 in the indicated manner. Next, upward tension is applied to the wire line (not shown) and such tension is applied to the testing tool 16 by means of a fishing tool (not shown) attached to the fish neck 18. As a consequence, shearing of the shear pin 34 will occur so that the fish neck 18, valve assembly 20, and supporting tube 22 will be raised upwardly relative to the body portion 26. As a consequence, the lower shoulder 42 on the supporting tube 22 will be brought into bearing engagement with the upper shoulder 38 on the body portion 26 and the outer port 40 will be brought into alignment with the inner port 44. As a consequence, the check valve 54 will be bypassed by flow through the aligned ports 40 and 44 so that pressure will be equalized above and below the testing tool 16. As a consequence, the testing tool 16 may be raised through the tubing 12 without difficulty. From the foregoing description, it is seen that the body portion 26 has an opening extending therethrough and that the fish neck 18, valve assembly 20 and supporting tube 22, considered as a unit, provide a mandrel which partially closes the opening in the body portion 26 while also communicating the space above the packing member 68 with the space therebelow. It will also be seen that shear pin 34 provides a means carried by the body portion 26, which engages the supporting tube 22 to support the supporting tube 22 in a position which permits fluid communication between the top and bottom of the body portion 26. The valve 54 provides a means carried by the mandrel for closing the opening on application of downwardly directed fluid pressure while the port 44 provides a means which is movable on application of upward tension (as a result of shearing of the pin 34) to reestablish the fluid communication when the port 44 is brought into alignment with the port 40 of the body member 26. Packer 30 is deformable on the application of downwardly directed fluid pressure and has slips 24 (an anchoring means) embedded therein. Also, it is seen that the shoulder 42 of the supporting tube 22 provides an independent means for supporting the body portion 26 (by engagement with shoulder 38 on body portion 26) on continued application of upward tension.

Testing tool of Figure 2

Turning now to Fig. 2, there is shown another embodiment of the present invention which may be used for testing the soundness of a length of tubing 12' inserted in a suitable casing (not shown) in a well bore (not shown). In this showing, the numeral 100 designates generally a modified type of testing tool for use in wire line tubing testing operations. The tool 100 comprises a cylindrical body portion 102 having an opening 104 extending therethrough. The body portion 102 is preferably of a thick-walled construction in order to provide weight for the testing tool 100. There is threadedly or otherwise suitably fixed to the top of the body portion 102 an inverted cup-shaped upper cage member 106 having a plurality of openings 108 in the side wall thereof and an opening 110 in the top wall thereof. There is also threadedly or otherwise suitably mounted on the bottom of the body portion 102 a lower, open-bottomed cage member 117. A perforate plate 114 is mounted in the bottom of the lower cage member 117 and secured therein by any suitable means such as through the provision of a plurality of set screws 116. A tubular mandrel 118 is mounted in the opening 104 of the body portion 102. A side wall perforated flow cage 120 is threadedly or otherwise suitably attached to the top of the mandrel 118 and a suitable fish neck 122 is passed through the opening 110 in the upper cage member 106 and secured to the top of the flow cage 102. A ball check valve assembly 124 is supported on the bottom of the mandrel 118 by any suitable means such as through the provision of a plurality of shear pins 126.

The valve assembly 124 comprises a cage member 128 having an upper opening 130 and a lower opening 132. A ball 134 of a suitable diameter is mounted in the cage member 128 and a suitable spider 136 is fixed to the top of the cage member 128 in order to prevent the ball 134 from closing the upper opening 130.

The testing tool 100 also comprises a packing member 138 deformable in response to downwardly directed fluid pressure. A suitable packing member 138 may comprise, for example, a retaining ring 140 threadedly or otherwise suitably connected with the lower cage member 117 and a deformable upwardly outwardly flaring cup member 142 formed of any suitable material such as hard rubber. A plurality of suitable slips 144 are secured to the cup member 142 below the lip thereof and keyed to the retaining ring 140.

A fluid seal between the opening 104 of the cage member 117 and the mandrel 118 is provided by any suitable means such as through the provision of O-rings 146.

It will be noted from Fig. 2 that the mandrel 118 and the cage member 128 of the ball check valve assembly 124 are proportioned in a manner such that the cage member 128 normally bears against the corresponding surface of the lower cage member 117 in order to provide a support for the tool 100.

Operation of the testing tool of Figure 2

In operation, the testing tool 100 is lowered through the tubing 12' to a selected depth by means of a suitable fishing tool (not shown) supported by a wire line (not shown); the fishing tool being attached to the fish neck 122. While the testing tool 100 is being lowered through the tubing 12', fluent material in the tubing 12' will be bypassed by upward flow about the testing tool 100 and by flow through the perforated plate 114, the lower opening 132 of the cage member 128, and the upper opening 130 thereof into the interior of the tubular mandrel 118. Fluent material will flow upwardly through the mandrel 118, out the perforations of the upper cage member 106 and from thence through the openings 108 and 110 in the upper cage member 106.

When the testing tool 100 has been lowered to a desired depth, fluid pressure is directed downwardly through the tubing 12'. As a consequence, fluent material through the tubing 12' will be forced into the space between the deformable cup member 142 and the body portion 102 to expand the cup member 142 and bring the slips 144 into holding engagement with the wall of the tubing 12'. The flow of fluent material through the interior of the testing tool 100 will be the reverse of the flow path described above and, as a consequence, the ball 134 will seat in the lower opening 132 of the check valve assembly 134. As a result, the portion of the tubing 12' above the testing tool 100 will be isolated from the portion therebelow and may be tested for soundness through the continued application of fluid pressure to the portion of tubing above the testing tool 100. If a substantially constant pressure is maintained, the tubing is sound; while if there is a decline in pressure, the presence of a leak is indicated.

After testing a portion of the tubing 12' in the indicated manner, fluid pressure above and below the testing tool 100 is equalized in a suitable manner (e.g., by bleeding the tubing at the well head) and the testing tool 100 is then lowered to the next desired position in the tubing and set therein in the indicated manner. In this fashion, all or a selected portion of the tubing 12' may be tested for soundness.

When testing operations have been concluded and it is desired to remove the testing tool 100 from the tubing 12', the testing tool 100 is fixed in position at any desired point along the length of the tubing 12' through the application of downwardly directed fluid pressure in the indicated manner. As a consequence, the slips 144 will firmly engage the wall of the tubing 12' and the check ball 134 will be seated in the lower opening 132 of the check valve assembly 124. Next, upwardly directed tension is applied to the fish neck 122 and mandrel 118 by means of the supporting wire line and fishing tool (not shown). When this is done, the shear pins 126 will be sheared and the check valve assembly 124 will drop from the mandrel 118 onto the perforate plate 114. As a consequence, the ball check valve assembly 124 will be effectively bypassed. After this has been done, the testing tool 100 will be supported by bearing engagement of the flow cage 120 with the upward inner surface of the upper cage member 106. As a result, fluid pressure above and below the testing tool 100 will be equalized while the testing tool 100 is being raised through the tubing 12' for removal therefrom. From the foregoing description of the operation of the tool shown in Fig. 2, it is seen that the body portion 102 has an opening extending therethrough and that the tubular mandrel 118 partially closes the opening in the body portion 102. It is also seen that the cage member 128 of the ball check valve assembly 124 which is releasably secured to the mandrel 118 by shear pin 126 bears against the under surface of the cage member 117 so that the under surface of the cage member 117 provides a means carried by the body portion which engages the mandrel for supporting the mandrel in a position to provide unrestricted fluid communication between the top and bottom of the body portion. The check valve 134 provides a means for closing the opening of the body portion 102 on application of downwardly directed fluid pressure. Packer 142 is deformable on the application of downwardly directed fluid pressure and has slips 144 (an anchoring means) embedded therein. The shear pin 126 and check valve assembly 124 provide a means on the mandrel movable on application of upward tension to reestablish fluid communication (by releasing the check valve assembly 124). It is also seen that the upper surface of the flow cage 120 will bear against the corresponding under surface of the upper cage member 106 on the body portion 102 to provide a means on the mandrel independent of the closing means (check valve 134) for supporting the body portion 102 on the mandrel 118 on continued application of upward tension.

Testing tool of Figure 3

A still further modification of the present invention is shown in Fig. 3; the modification of Fig. 3 being operable to seat in collar recesses of a length of tubing. In Fig. 3 there is shown a length of tubing comprising tubing sections 12a and 12b interconnected by means of a collar 200, whereby a collar recess 202 is defined between the opposed ends of the tubing sections 12a and 12b. A modified tubing testing tool 204 of the present invention is also shown in Fig. 3. The tool 204 comprises a body portion 206 having an upper cup-shaped opening 208 defined by a cylindrical wall segment 210. The opening 208 is provided with a suitable flow port 212 in the bottom thereof. The body portion 206 also preferably comprises a sinker rod section 214 to provide weight for the tool 204. A deformable upwardly outwardly extending rubber packing member 216 is secured to the upper end of the cylindrical wall segment 210 and a metallic expansion ring 218 is fixed to the outer surface of the packing member 216 intermediate the ends thereof. There is also provided a cylindrically shaped mandrel 220 having a fish neck 221 at the top thereof and a support spider 222 fixed to the mandrel 220 adjacent the lower end thereof. The portion of the mandrel 220 having the spider 222 affixed thereto is mounted in the opening 208 and secured therein by means of a retaining ring 224 fixed to the interior surface of the cylindrical wall segment 210 adjacent the top thereof. The lower end of the mandrel 220 is rounded at 226 to define a valve means for closing port 212 in a manner to be described. A valve seat 228 formed of any suitable material such as hard rubber is provided therefor and mounted in the bottom of the opening 208 about the flow port 212.

Operation of the testing tool of Figure 3

In operation, the testing tool 204 is lowered within a length of tubing by means of a fishing tool wire line combination (not shown) to a desired depth.

While the testing tool 204 is being lowered, fluent material is bypassed by flow about the testing tool 204 and also by means of upward flow through the port 212 and the opening 208 in the body portion 206. Thus, for example, the tool 204 may be lowered to a point wherein the deformable packing member 216 is above and adjacent the collar recess 202 defined by the collar 200 and the tubing sections 12a and 12b.

Next, fluid pressure is directed downwardly through the length of tubing and at the same time the wire line (not shown) is suddenly slacked off. As a result, the deformable packing member 216 is forced outwardly into engagement with the wall of the tubing section 12a and the mandrel 220 is caused to drop relative to the body portion 206 whereby the valve means rounded end 226 is firmly seated in the valve seat 228. The continued application of downwardly directed fluid pressure will cause the thus partially set testing tool 204 to slowly descend until the packing member 216 is seated in the collar recess 202, at which time the testing tool 204 will be positively positioned between the tubing sections 12a and 12b. The soundness of the tubing section 12a and similar tubing sections thereabove may then be tested in the above-described manner.

When it is desired to lower the testing tool 204 still further, pressure is equalized above and below the tool 204 and tension is applied to the fish neck of the mandrel 220 by means of the wire line-fishing tool combination (not shown) in order to raise the valve means 226 from the valve seat 228. Thus, in this embodiment, the fish neck at the top of the mandrel 220 serves as a means carried by the testing tool for releasing the valve means (rounded end portion 226) from the valve seat 228 to open the port 12. As a consequence, pressure is equalized above and below the testing tool 204 and the tool 204 may be lowered to a further depth.

It will be manifest that when it is desired to raise the tubing testing tool 204, the upward pull on the mandrel 220 will maintain the spider 222 in bearing engagement with the retaining ring 224 whereby fluent material may be by-passed by downward flow through the opening 208 and the port 212. From the foregoing description of the tool shown in Fig. 3, it is seen that the body portion 206, through the provision of cup-shaped opening 208 retaining ring 224 and flow port 212 is provided with an opening which extends therethrough. It is further seen that the mandrel 220 which extends through the opening in the retaining ring 224 partially closes the opening in the retaining ring 224 which is fixed to the body portion 206. It is also seen that the undersurface of the retaining ring 224 provides a means carried by the body portion and engaging the mandrel (through the provision of support spider 222) for supporting the mandrel in a position to provide unrestricted fluid communication between the top and bottom of the body portion through the normally unclosed portion of the opening therein. It is also seen that the rounded portion 226 of the mandrel 220 provides a means carried by the mandrel for closing the opening in the body portion 206 on application of downwardly directed fluid pressure. Packing member 216 is deformable on the application of downwardly directed fluid pressure and expansion ring 218 (an anchoring means) is embedded therein. The fish neck on the mandrel 220 provides a means on the mandrel movable on application of upward tension to reestablish unrestricted fluid communication (by lifting rounded portion 226 from valve seat 228 on the body portion 206). It is further seen that the top surfaces of the support spider 222 provide a means on the mandrel which is independent of the closing means (rounded portion 226) for supporting the body portion 206 (through engagement with the undersurface of retaining ring 224) on the mandrel on continued application of upward tension to the mandrel.

What is claimed is:

1. A wire line testing tool insertable in a string of tubing for testing the soundness of said tubing comprising a body portion having an opening extending therethrough, a mandrel in said opening partially closing the same, means carried by said body portion and engaging said mandrel for supporting said mandrel in a position to provide unrestricted fluid communication between the top and bottom of said body portion through the normally unclosed portion of said opening, closing means carried by said mandrel for closing said normally unclosed portion of said opening on application of downwardly directed fluid pressure, a deformable packing member fixed to the outside of said body portion, said packing member having a surface portion deformable into engagement with said wall of said opening on closing of said normally unclosed portion of said opening, anchoring means embedded in said surface portion of said packing member, means on said mandrel movable on application of upward tension to said mandrel for reestablishing said unrestricted fluid communication, and means on said mandrel independent of said closing means for supporting said body portion on said mandrel on continued application of upward tension to said mandrel.

2. A wire line testing tool insertable in a string of tubing mounted in a casing traversing a well bore for testing the soundness of said tubing comprising a tubular body portion having an opening extending therethrough defining an interior shoulder, a deformable upwardly facing cup-shaped packing member fixed to the outside of said body portion, said packing member being deformable on the application of downwardly directed fluid pressure, means carried by said packing member for engaging said testing tool with the wall of said tubing, an exteriorly shouldered, interiorly bored mandrel positioned in said opening, valve means carried by said mandrel for closing said bore of said mandrel on the application of downwardly directed fluid pressure, and releasable support means comprising a frangible member carried by said mandrel for supporting said body portion on said mandrel, said releasable support means being operable on the application of upwardly directed tension to said mandrel to break said frangible member to prevent said valve means from closing said bore, said bore of said mandrel communicating the space above said packing member with the space below said packing member.

3. A wire line testing tool insertable in a string of tubing mounted in a casing traversing a well bore for testing the soundness of said tubing comprising a tubular body member having an opening extending therethrough defining an interior shoulder adjacent the top of said body portion, said body portion having a port in the side thereof intermediate said shoulder and the bottom of said body portion, a deformable upwardly facing cup-shaped packing member fixed to the outside of said body portion, said packing member being deformable on the application of downwardly directed fluid pressure, means carried by said packing member for engaging said testing tool with the wall of said tubing, an interiorly bored mandrel positioned in said opening, said mandrel having an exterior shoulder adjacent the bottom thereof and a port in the side thereof below and adjacent to said exterior shoulder, valve means mounted in said bore of said mandrel for closing the same upon the application of downwardly directed fluid pressure, and frangible means interconnecting said mandrel and said body portion for supporting said body portion on said mandrel with said exterior shoulder of said mandrel positioned below said port in said body portion, whereby, upon application of upwardly directed tension to said mandrel, said frangible means will be broken to permit said exterior shoulder of said mandrel to engage said interior shoulder of said body portion and to bring said ports of said mandrel and said body portion into alignment, said bore of said mandrel communicating the space above said packing member with the space below said packing member.

4. A wire line testing tool insertable in a string of tubing mounted in a casing traversing a well bore for testing the soundness of said tubing comprising a tubular body portion having an opening extending therethrough, a deformable upwardly facing cup-shaped packing member fixed to the outside of said body portion, said packing member being deformable on the application of downwardly directed fluid pressure, means carried by said packing member for engaging said testing tool with the wall of said tubing, an upper side wall perforated cage member mounted on the top of said body portion, said cage member having an opening in the top thereof, a lower bottom perforated cage member mounted on the bottom of said body portion, a tubular mandrel mounted in said opening of said body portion, valve means in said lower cage member positioned on said mandrel, said valve means being closable on the application of downwardly directed fluid pressure, frangible means fixing said valve means to said mandrel, a side wall perforated flow cage in said upper cage member mounted on said mandrel, and means extending through said upper opening of said upper cage member and fixed to said flow cage, whereby, upon application of upwardly directed tension to said fish neck said frangible means will be broken to permit release of said valve means from said mandrel, said bore of said mandrel communicating the space above said packing member with the space below said packing member.

5. A wire line testing tool insertable in a string of tubing mounted in a casing traversing a well bore for testing the soundness of said tubing comprising a tubular body portion having an opening extending therethrough, a support ring fixed in said opening adjacent the top thereof, an upwardly facing cup-shaped packing member fixed to the top of said body portion above said support ring, said packing member being deformable on the application of downwardly directed fluid pressure, an expansion ring on the exterior lip of the cupped portion of said packing member for engaging said testing tool with a tubing joint of said tubing on expansion of said deformable packing member, a round-bottomed elongated mandrel extending through said opening of said packing member and said support ring into said opening in said body portion, a spider mounted on said mandrel adjacent the bottom thereof engageable with said support ring for supporting said body portion on said mandrel, and seating means in said opening engageable with said round bottom of said mandrel for closing said opening.

References Cited in the file of this patent

UNITED STATES PATENTS

| | | |
|---|---|---|
| 2,164,195 | Waltermire | June 27, 1939 |
| 2,248,169 | Granger | July 8, 1941 |
| 2,377,501 | Kinley | June 5, 1945 |
| 2,540,322 | Christensen | Feb. 6, 1951 |
| 2,578,900 | Ragan | Dec. 18, 1951 |
| 2,610,691 | Berry | Sept. 16, 1952 |
| 2,630,866 | Ragan | Mar. 10, 1953 |
| 2,742,093 | Vaughn | Apr. 17, 1956 |
| 2,802,532 | Burtner et al. | Aug. 13, 1957 |
| 2,810,441 | Baker | Oct. 22, 1957 |
| 2,868,297 | Lamberson | Jan. 13, 1959 |